(12) United States Patent
Bronson et al.

(10) Patent No.: US 10,594,169 B2
(45) Date of Patent: Mar. 17, 2020

(54) WIRELESS POWER TRANSMISSION SYSTEM HAVING POWER CONTROL

(71) Applicant: WITRICITY CORPORATION, Watertown, MA (US)

(72) Inventors: Daniel Bronson, Nibley, UT (US); Conor Joseph Rochford, Boston, MA (US)

(73) Assignee: WITRICITY CORPORATION, Watertown, MA (US)

( * ) Notice: Subject to any disclaimer, the term of this patent is extended or adjusted under 35 U.S.C. 154(b) by 146 days.

(21) Appl. No.: 15/855,189

(22) Filed: Dec. 27, 2017

(65) Prior Publication Data

US 2018/0191206 A1   Jul. 5, 2018

Related U.S. Application Data

(60) Provisional application No. 62/439,985, filed on Dec. 29, 2016.

(51) Int. Cl.
| | |
|---|---|
| *H01M 10/44* | (2006.01) |
| *H01M 10/46* | (2006.01) |
| *H02J 50/80* | (2016.01) |
| *G06F 1/3234* | (2019.01) |
| *G06F 1/28* | (2006.01) |
| *H02J 50/10* | (2016.01) |
| *H02J 50/12* | (2016.01) |
| *B60L 53/12* | (2019.01) |

(52) U.S. Cl.
CPC .............. *H02J 50/80* (2016.02); *B60L 53/12* (2019.02); *G06F 1/28* (2013.01); *G06F 1/3234* (2013.01); *H02J 50/10* (2016.02); *H02J 50/12* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ...... H02J 7/0021; H02J 7/0026; H02J 7/1446; H02J 7/1453; H02J 7/0091
USPC ........ 320/104, 132, 134, 136, 150, 153, 135
See application file for complete search history.

(56) References Cited

U.S. PATENT DOCUMENTS

2009/0096413 A1 * 4/2009 Partovi .................. H01F 5/003
                                                            320/108
2010/0063347 A1   3/2010 Yomtov et al.
(Continued)

FOREIGN PATENT DOCUMENTS

| CN | 105552988 | 5/2016 |
| KR | 20160104449 | 9/2016 |
| WO | WO 2013/023694 | 2/2013 |

OTHER PUBLICATIONS

PCT International Preliminary Report dated Jul. 11, 2019 for International Application No. PCT/US2017/068489; 7 Pages.
(Continued)

*Primary Examiner* — Edward Tso
(74) *Attorney, Agent, or Firm* — Daly Crowley Mofford & Durkee, LLP

(57) ABSTRACT

Methods and apparatus to control load power in a wireless power transfer system having one or more power receiving devices and one or more power transmitting sources. In embodiments, device temperature, current level, and/or other information can be used to control power to a load energized by a device.

19 Claims, 9 Drawing Sheets

(56) References Cited

U.S. PATENT DOCUMENTS

| | | | | |
|---|---|---|---|---|
| 2013/0033118 A1* | 2/2013 | Karalis | ............... | H02J 50/12 |
| | | | | 307/104 |
| 2013/0181539 A1* | 7/2013 | Muratov | ............... | H01F 38/14 |
| | | | | 307/104 |
| 2014/0021914 A1 | 1/2014 | Martin et al. | | |
| 2014/0084701 A1* | 3/2014 | Bae | ............... | H02J 50/12 |
| | | | | 307/104 |
| 2014/0159654 A1 | 6/2014 | Lee et al. | | |

OTHER PUBLICATIONS

Rezence, "A4WP Wireless Power Transfer System Baseline System Specification (BSS)," V1.2.1; Final Approved Specification; May 7, 2014; 98 Pages.

PCT International Search Report and Written Opinion dated Mar. 5, 2018 for International Application No. PCT/US2017/068489; 13 pages.

* cited by examiner

WIRELESS POWER TRANSMISSION SYSTEM HAVING POWER CONTROL

CROSS-REFERENCE TO RELATED APPLICATIONS

This patent application claims priority to U.S. Provisional Patent Application No. 62/439,985, filed Dec. 29, 2016, entitled, "Wireless Power Transmission System Having Power Control," the disclosure of which is incorporated herein, in its entirety, by reference.

TECHNICAL FIELD

This disclosure relates to wireless energy transfer and methods for controlling the amount of power to the load of wireless power systems.

BACKGROUND

Wireless power transfer systems may rely on electronic circuits such as rectifiers, AC (Alternating Current) to DC (Direct Current) converters, impedance matching circuits, and other power electronics to condition, monitor, maintain, and/or modify the characteristics of the voltage and/or current used to provide power to electronic devices. Power electronics can provide power to a load with dynamic input impedance characteristics.

SUMMARY

Wireless power transmission systems may rely on electronic circuits, such as rectifiers, AC (Alternating Current) to DC (Direct Current) converters, impedance matching circuits, and other power electronics to condition, monitor, maintain, and/or modify the characteristics of the voltage and/or current used to provide power to electronic devices. Power electronics can provide power to a load with dynamic input impedance characteristics. In some cases, in order to enable efficient power transfer, a dynamic impedance matching network is provided to match varying load impedances to that of the power source.

Wireless power transmission systems may include a power transmission source that provides power wirelessly to a power receiving device that energizes a load. Embodiments provided herein describe methods and apparatus to control an amount of power to the load. Messages may be communicated and received to achieve certain loading characteristics, such as power control.

In one aspect, a method comprises: powering a load coupled to a device receiving wireless transfer of energy from a source; gathering operating information for the device; processing the gathered operating information; generating a message by the device commanding the load to adjust a power draw of the load based on the processed operating information; and sending the message to the load.

A method can include one or more of the following features: the operating information includes temperature information for the device, the operating information includes at least one current measurement in the device, the at least one current measurement in the device comprises a measurement of rectifier current, the operating information includes at least one of temperature information, current measurement in the source, current measurement in the device, and/or coupling efficiency between the source and the device, determining one or more maximum powers based on one or more pieces of the gathered operating information and selecting the lowest power from the one or more maximum powers, determining one or more maximum powers based on one or more pieces of the gathered operating information, and weighting one or more maximum powers determined by one or more pieces of operating information, weighting the one or more maximum powers based on risk and/or priority, determining one or more maximum powers based on one or more pieces of the gathered operating information, and averaging the one or more maximum powers, determining one or more maximum powers based on one or more pieces of the gathered operating information, and sorting the one or more maximum powers into categories of priorities, the message to the load includes a maximum power that the load can request, the message to the load includes a maximum current that the load can request, the message to the load includes at least one of a constant current, a constant voltage, and a constant power that the load can request, the load comprises a battery of an electric vehicle, the device throttles power to the load by a step size, the step size includes a throttle step size for decreasing power to the load that is different than a throttle step size for increasing power to the load, the device throttles power to the load to avoid exceeding a maximum rectifier current in the device, and/or sending a message to the load with a command to reduce power draw of the load.

In another aspect, a system comprises: a device to receive wireless transfer of energy from a source, wherein the device is configured to power a load, wherein the device comprises a processor configured to: gather operating information for the device; process the gathered operating information; generate a message commanding the load to adjust a power draw of the load based on the processed operating information; and send the message to the load.

A system can include one or more of the following features: the operating information includes temperature information for the device, the operating information includes at least one current measurement in the device, the at least one current measurement in the device comprises a measurement of rectifier current, the operating information includes at least one of temperature information, current measurement in the source, current measurement in the device, and/or coupling efficiency between the source and the device, determining one or more maximum powers based on one or more pieces of the gathered operating information and selecting the lowest power from the one or more maximum powers, determining one or more maximum powers based on one or more pieces of the gathered operating information, and weighting one or more maximum powers determined by one or more pieces of operating information, weighting the one or more maximum powers based on risk and/or priority, determining one or more maximum powers based on one or more pieces of the gathered operating information, and averaging the one or more maximum powers, determining one or more maximum powers based on one or more pieces of the gathered operating information, and sorting the one or more maximum powers into categories of priorities, the message to the load includes a maximum power that the load can request, the message to the load includes a maximum current that the load can request, the message to the load includes at least one of a constant current, a constant voltage, and a constant power that the load can request, the load comprises a battery of an electric vehicle, the device throttles power to the load by a step size, the step size includes a throttle step size for decreasing power to the load that is different than a throttle step size for increasing power to the load, the device throttles power to the load to avoid exceeding a maximum rectifier current in the device, and/or sending a message to the load with a command to reduce power draw of the load.

DETAILED DESCRIPTION

Figure 1:
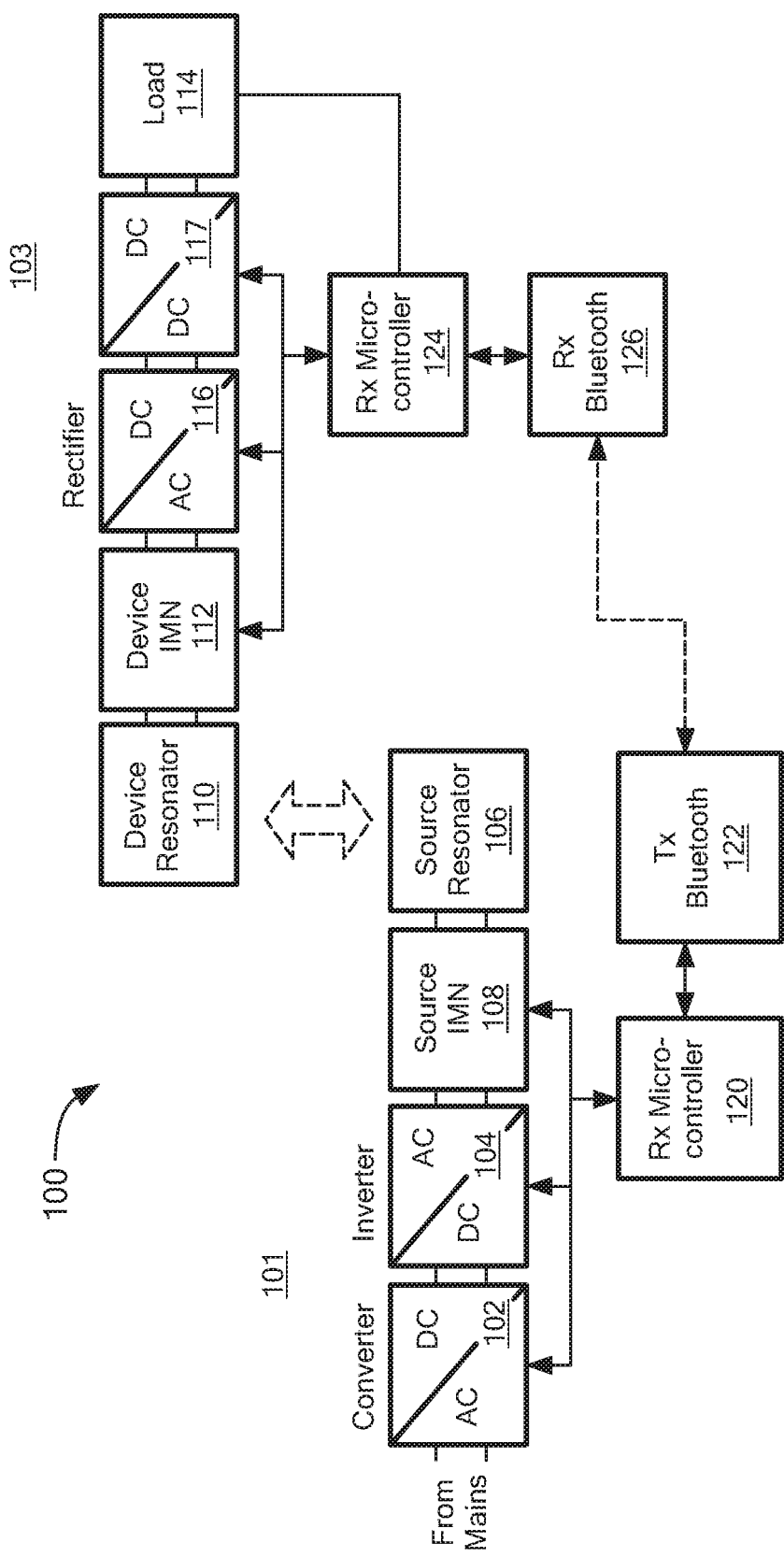
FIG. 1 is a schematic representation of a wireless energy transfer system having power control capability.

FIG. 1 shows a high level functional block diagram of an illustrative embodiment of a wireless power transfer (WPT) system 100 having power control capability for an example system having a source 101, which can be considered a source that provides wireless energy to a receiving device 103, which can be provided as a device that can be coupled a load 114. For example, the source 101 can form part of a ground assembly (GA) of an automotive wireless power transfer system, and the device can be part of a vehicle assembly (VA) of the automotive WPT system. Input power to the system can be provided by wall power (AC mains), for example, which is converted to DC in an AC/DC converter block 102. Alternatively, a DC voltage can be provided directly from a battery or other DC supply. In embodiments, the AC/DC converter block 102 may be a power factor correction (PFC) stage. The PFC, in addition to converting the AC input (for example, at 50 or 60 Hz) to DC, can condition the current such that the current is substantially in phase with the voltage. A high efficiency switching inverter or amplifier 104 converts the DC voltage into an AC voltage waveform used to drive a source resonator 106. In embodiments, the frequency of the AC voltage waveform may be in the range of 80 to 90 kHz. In embodiments, the frequency of the AC voltage waveform may be in the range of 10 kHz to 15 MHz. A source impedance matching network (IMN) 108 efficiently couples the inverter 104 output to the source resonator 106 and can enable efficient switching-amplifier operation. Class D or E switching amplifiers are suitable in many applications and can require an inductive load impedance for highest efficiency. The source IMN 108 transforms the source resonator impedance into an impedance for the inverter 104. The source resonator impedance can be, for example, loaded by the coupling to a device resonator 110 and/or output load. The magnetic field generated by the source resonator 106 couples to the device resonator 110, thereby inducing a voltage. This energy is coupled out of the device resonator 110 to, for example, directly power a load 114, such as charging a battery. A device impedance matching network (IMN) 112 can be used to efficiently couple energy from the device resonator 110 to the load 114 and optimize power transfer between source resonator 106 and device resonator 110. It may transform the actual load impedance into an effective load impedance seen by the device resonator 110 which more closely matches the loading for optimum efficiency. For loads requiring a DC voltage, a rectifier 116 converts the received AC power into DC. A DC/DC converter 117 can regulate the voltage for the load 114. In embodiments, the source 101 and device 103 can further include filters, sensors, and other components.

The impedance matching networks (IMNs) 108, 112 can be designed to maximize the power delivered to the load 114 at a desired frequency (e.g., 80-90 kHz, 100-200 kHz, 6.78 MHz) and/or to maximize power transfer efficiency. The impedance matching components in the IMNs 108, 112 can be chosen and connected so as to preserve a high-quality factor (Q) value of resonators 106, 110. Depending on the operating conditions, the components in the IMNs 108, 112 can be tuned to control the power delivered from the power supply to the load 114, for example, to maximize efficient wireless transmission of power.

The IMNs' (108, 112) components can include, for example, a capacitor or networks of capacitors, an inductor or networks of inductors, or various combinations of capacitors, inductors, diodes, switches, and resistors. The components of the IMNs can be adjustable and/or variable and can be controlled to affect the efficiency and operating point of the system. Impedance matching can be performed by varying capacitance, varying inductance, controlling the connection point of the resonator, adjusting the permeability of a magnetic material, controlling a bias field, adjusting the frequency of excitation, and the like. The impedance matching can use or include any number or combination of varactors, varactor arrays, switched elements, capacitor banks, switched and tunable elements, reverse bias diodes, air gap capacitors, compression capacitors, barium zirconium titanate (BZT) electrically tuned capacitors, microelectromechanical systems (MEMS)-tunable capacitors, voltage variable dielectrics, transformer coupled tuning circuits, and the like. The variable components can be mechanically tuned, thermally tuned, electrically tuned, piezo-electrically tuned, and the like. Elements of the impedance matching can be silicon devices, gallium nitride devices, silicon carbide devices, and the like. The elements can be chosen to withstand high currents, high voltages, high powers, or any combination of current, voltage, and power. The elements can be chosen to be high-Q elements.

The IMNs 108, 112 and/or control circuitry monitors impedance differences between the source and the device and provides control signals to tune the IMNs 108, 112 or components thereof. In some implementations, the IMNs 108, 112 can include a fixed IMN and a dynamic IMN. For example, a fixed IMN may provide impedance matching between portions of the system with static impedances or to grossly tune a circuit to a known dynamic impedance range. In some implementations, a dynamic IMN can be further composed of a coarsely adjustable components and/or a finely adjustable components. For example, the coarsely adjustable components can permit coarse impedance adjustments within a dynamic impedance range whereas the finely adjustable components can be used to fine tune the overall impedance of the IMN(s). In another example, the coarsely adjustable components can attain impedance matching within a desirable impedance range and the finely adjustable components can achieve a more precise impedance around a target within the desirable impedance range.

It is understood that the source and/or device impedance matching networks can have a wide range of circuit implementations with various components having impedances to meet the needs of a particular application. U.S. Pat. No. 8,461,719 to Kesler et al. and U.S. Pat. No. 8,922,066 to Kesler et al., which are incorporated herein by reference, disclose a variety of tunable impedance networks, such as in FIGS. 28a-37b, for example.

In embodiments, the source 101 can include a processor module 120 to control overall operation of the source side components and a wireless communication module 122 coupled to the processor 120 to provide wireless communication to other units, such as the device 103. It is understood that any suitable wireless communication technology can be used, such as Bluetooth®, BLE (Bluetooth® Low Energy), WiFi, radio, and the like.

The device 103 can include a processor module 124 to control the overall operation of the device components and a wireless communication module 126 to enable the device to communicate with the source 101 and/or other devices or sources.

In some embodiments, the load 114 is collocated with and/or can be contained within the device 103. For example, the load 114 may comprise a battery powering a laptop computer, mobile phone, a vehicle, or other device. In other embodiments, the load 114 may be at least partly remote from the device and connected in some way to receive power from the device resonator, such as by electrical cable.

In embodiments, the source 101 and device 103 may exchange messages and/or the device 103, e.g., controller 124, and load 114 may exchange messages. For example, as described more fully below, the device 103 controller 124 may send commands to the load 114 to control loading characteristics, such as a power draw from the load, based on one or more parameters, such as temperature, current measurements, and the like.

For example, in an automotive WPT application, example parameters include vehicle power electronics temperature (for example, at the TMN, rectifier, or coil), vehicle battery temperature, ambient temperature, efficiency of electronics, coupling efficiency of power transfer, electrical grid characteristics, e.g., off/peak time, voltage level (loading), payment/price (e.g., tiered payment/price), and GA-based rationale, e.g., safety (Current/Voltage levels/Foreign Object detection), power sharing (e.g., between sources at adjacent parking spots), and/or GA power electronics temperature.

Figure 2A:
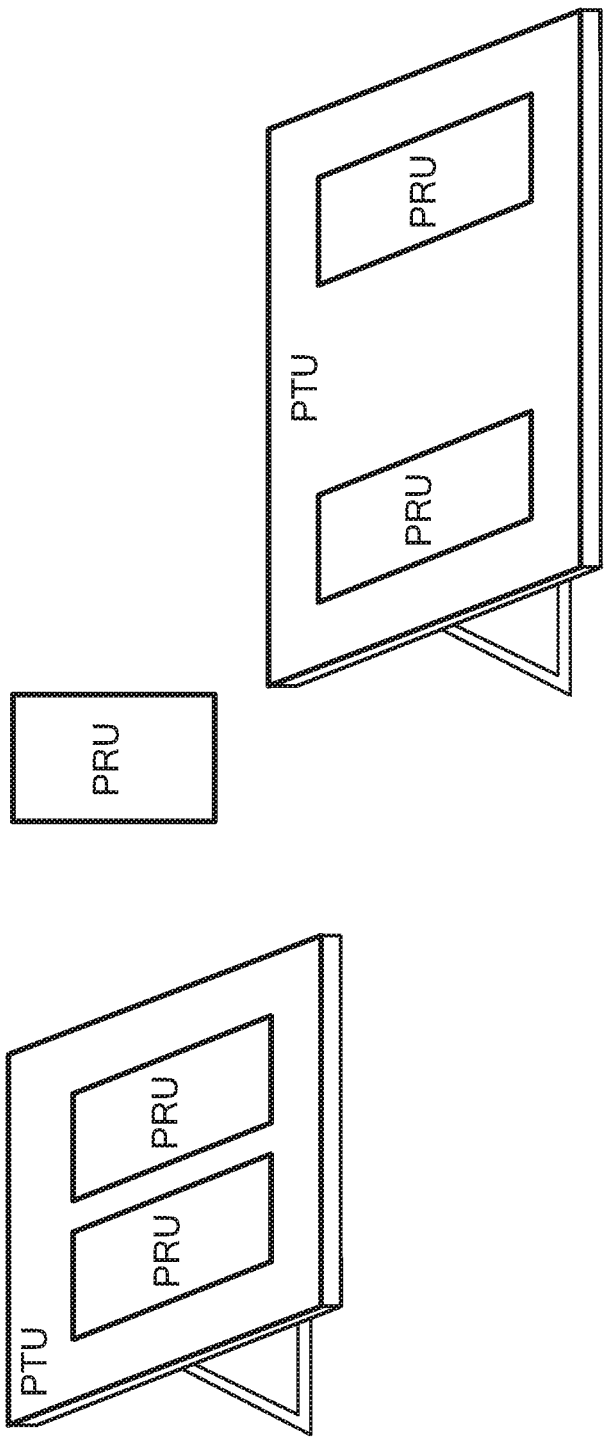
FIG. 2A is diagrammatic representation of power receiving units (PRUs) with power control that may be located on or near power transmitting units (PTUs)

FIG. 2A shows various devices shown as power receiving units (PRUs) on charging platforms of sources shown as power transmitting units (PTUs), as well as a nearby PRU. In embodiments, a power transmitting unit (PTU) interacts with a power receiving unit (PRU) via an in-band channel and an out-of-band channel. As used herein, in-band refers to power transmission channel between the PTU and PRU. In embodiments, the PTU can modulate the transmitted wireless energy to communicate with the PRU and the PRU can modify certain characteristics, such as impedance, to communicate with PRU. As described more fully below, a PRU may communicate with a load (not shown in FIG. 2A) for power control. In embodiments, a PTU may not be able to directly control a load on the PRU so the PTU may send messages/commands to the PRU to effect certain loading characteristics. As used herein, out-of-band refers to wireless communication between a PTU, PRU, load, and other device, via a wireless protocol, such as Bluetooth®. It is understood that any suitable wireless communication technology, protocol, etc., can be used to enable PTUs, PRUs, loads, etc., to communicate with each other. It is understood that the terms in-band and out-of-band are used for convenience and should not be used to limit the claimed invention in any way.

In embodiments, the power draw of a load powered by the PRU may need to be dynamically changed in response to certain operating conditions. For example, a PRU may have an operating temperature above a threshold. Further, a rectifier current on a PRU may be above a current threshold, which can be due, for example, to a relatively poor alignment of the PTU coil and the PRU coil. For example, a user may place a device on charging station but not completely within a designated charging area, which may degrade coupling efficiency of the PTU and PRU and increase current through the PRU rectifier. As another example, people may be getting in and out of a vehicle, and the changing distance of the device and source may change the coupling efficiency. Excessive PRU rectifier current can also be caused by relatively heavy loading of the PRU.

In some embodiments, as noted above, a PTU and PRU can communicate, such as via a wireless communication channel. At certain times, and/or, in response to one or more detected conditions, a PTU may send a command to a PRU to instruct the PRU to reduce power. At certain times, and/or, in response to one or more detected conditions, a PRU may send a command to a load (e.g., 114 FIG. 1) powered by the PRU to reduce power draw. Illustrative conditions that may cause message generation to reduce power draw from a load include reaching certain PTU-PRU power sharing parameters, PRU temperatures, PRU currents, and the like.

In embodiments, a PRU may obtain information, process the information, and control power draw from a load powered by the PRU. Example information can include PRU temperatures and PRU rectifier currents. It is understood that a temperature sensor can be located in or on a PRU at any suitable location. In illustrative embodiments, a PRU temperature sensor is located on or near the PRU rectifier (see, e.g., 116 FIG. 1). It is understood that the rectifier current is proportional to the power delivered to the load 114.

It is understood that the terms PTU and PRU should be construed broadly to cover any power transmitting/receiving devices having wireless power transfer capability. Resonant wireless power transfer is used as a nonlimiting example. Example devices include cell phones and laptops capable of wireless charging on a station, as well as devices for relatively high power applications, such as batteries for vehicles.

Figure 2B:
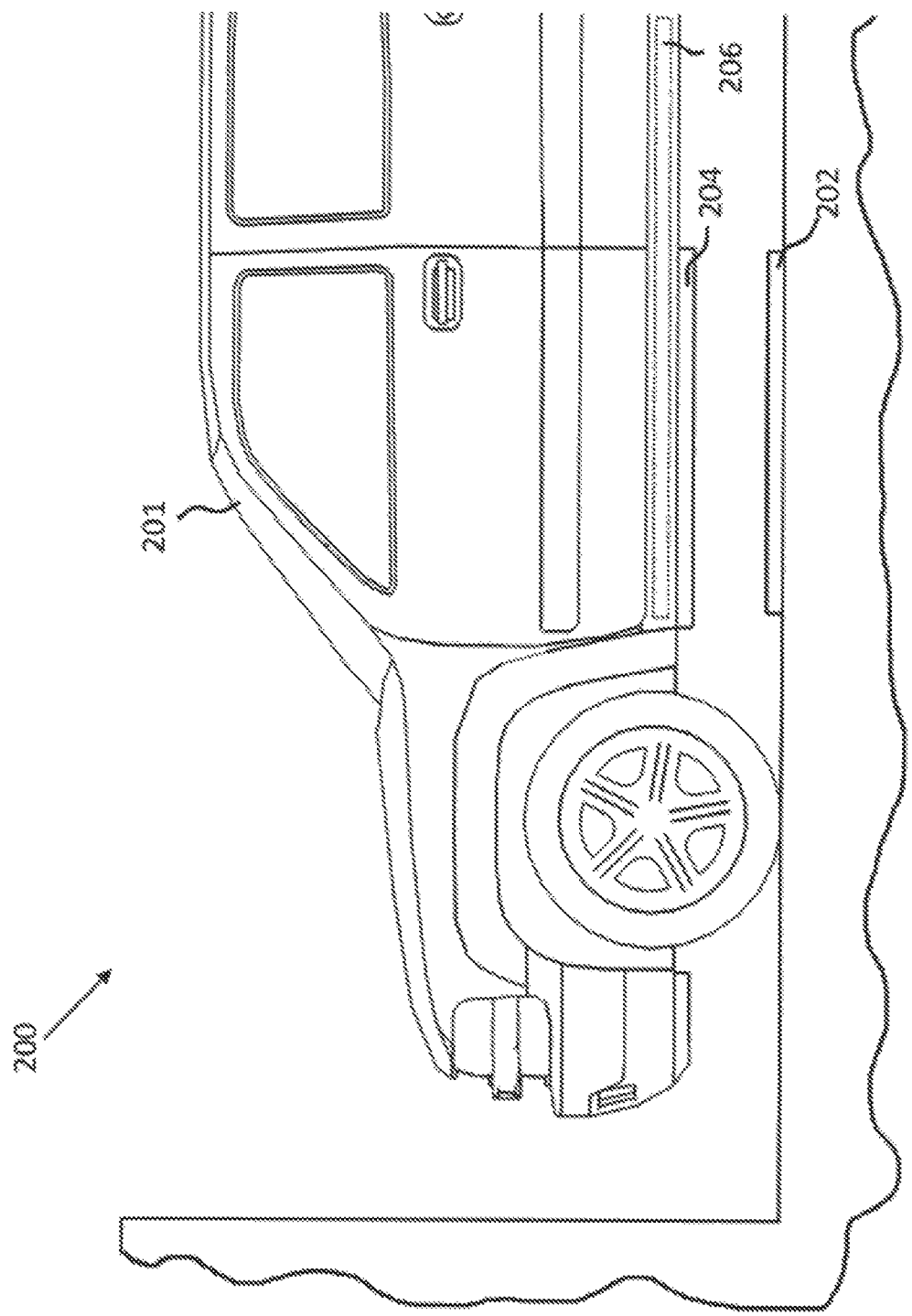
FIG. 2B is a diagrammatic representation of a vehicle wireless power transfer power receiving device for energizing a battery of an electric vehicle with power control.

FIG. 2B shows an example of a wireless power transmission system 200 for a vehicle 201 including a power transmitting source 202, which can be considered a power transmitting unit (PTU), or Ground Assembly (GA) aligned for coupling to a power receiving device 204, which can be considered a power receiving unit (PRU) or Vehicle Assembly (VA), coupled to a battery 206 of the vehicle, wherein the battery comprises a load 114 on the device 204 and battery management system. The power receiving device 204 can include power control as described herein.

Referring again to FIG. 1, in embodiments, a load 114 includes a module to receive and process messages from the device controller 124, which can be considered at least a portion of a battery management system. As described more fully below, the device 103 can detect certain conditions and send a message to the load 114 to reduce power, such as by some amount or to a specified level. The message can be over I2C bus, CAN bus interface, or the like. For example, the load 114 can comprise a battery with a control module to control the power delivered to the load. It is understood that message should be construed broadly. In some embodiments, messages can be sent by individual wires where one indicates up, for example, and another wire that indicates down.

Figure 3A:
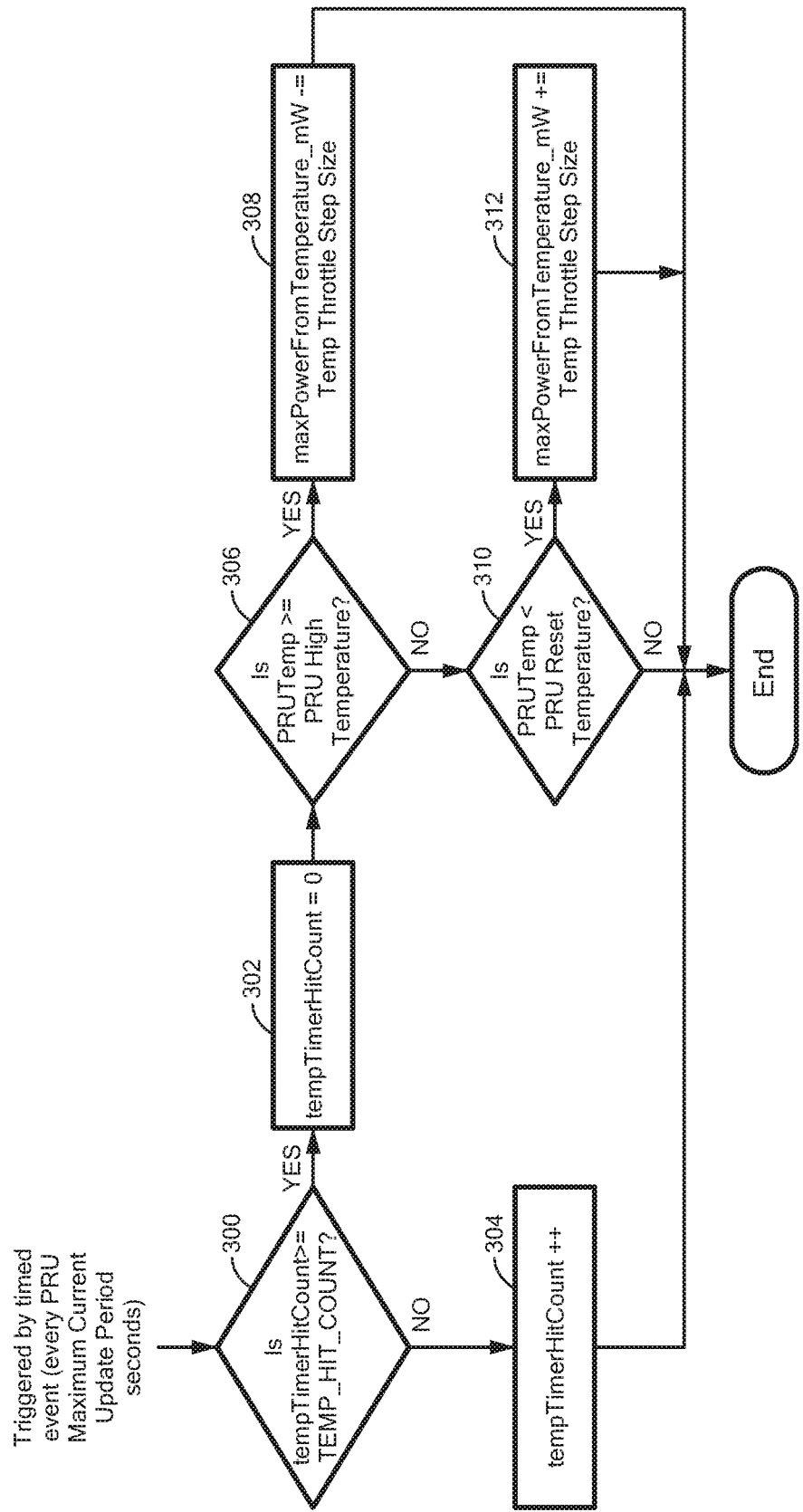
FIG. 3A is a flow diagram showing an illustrative sequence of steps for adjusting power to a load based on PRU temperature.
Figure 3B:
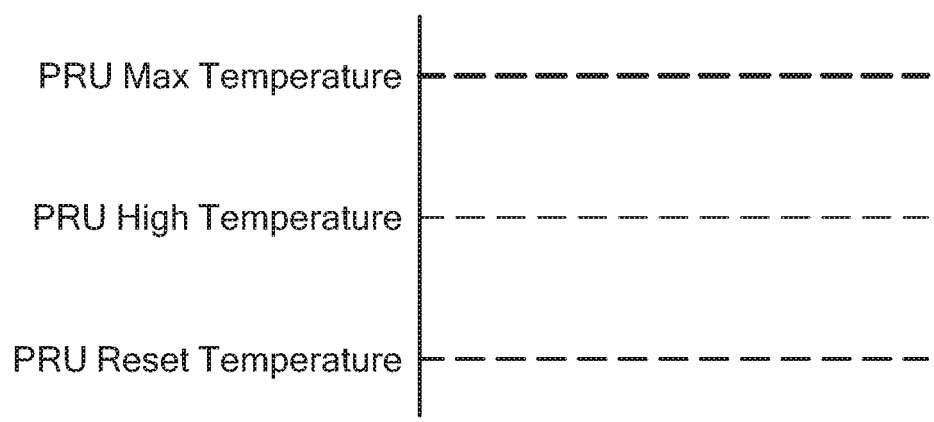
FIG. 3B is a graphical representation of illustrative temperature thresholds that may be used for the processing of FIG. 3A.

FIG. 3A shows a flow diagram for processing PRU temperature information in accordance with illustrative embodiments of the invention. FIG. 3B shows illustrative temperature thresholds as PRU Max Temperature, PRU High Temperature, and PRU Reset Temperature. In general, PRU temperature and/or power control should attempt to maintain PRU temperature below a threshold shown in FIG. 3B as PRU High Temperature while also delivering as much power to the load as possible. In embodiments, the PRU and/or PTU may enter a fault state for immediate action if the temperature rises above the PRU Max Temperature.

Steps 300, 302, 304, show illustrative processing to control how often and how many times temperature information is processed by incrementing and comparing a count value. In step 306, it is determined whether the measured PRU temperature is greater than the PRU High Temperature in FIG. 3B. If so, in step 308, the PRU decreases the loading by decreasing the amount of power the PRU is delivering to the load by an amount defined by a given step size, shown as Temp Throttle Step Size. In step 310, if the measured PRU temperature is less than PRU Reset Temperature of FIG. 3B, the PRU requests that the loading be increased by an amount of power shown as the Temp Throttle Step Size in step 312. It is understood that the power throttle size for increasing or decreasing power can be the same value or different values. If the measured PRU temperature is between the PRU High Temperature and PRU Reset Temperature (FIG. 3B), then no change is made to the requested power output.

It is understood that temperature processing can occur a given number of times per time interval to meet the needs of a particular application. In one particular application, PRU temperature is checked every six seconds. In embodiments, the processing interval and/or throttle step size can be increased or decreased based upon any number and/or combination of factors including temperature, power, temperature change slope, historical information, and the like. It is understood that any practical number of temperature thresholds and throttle step sizes can be used to meet the needs of a particular application.

Figure 4A:
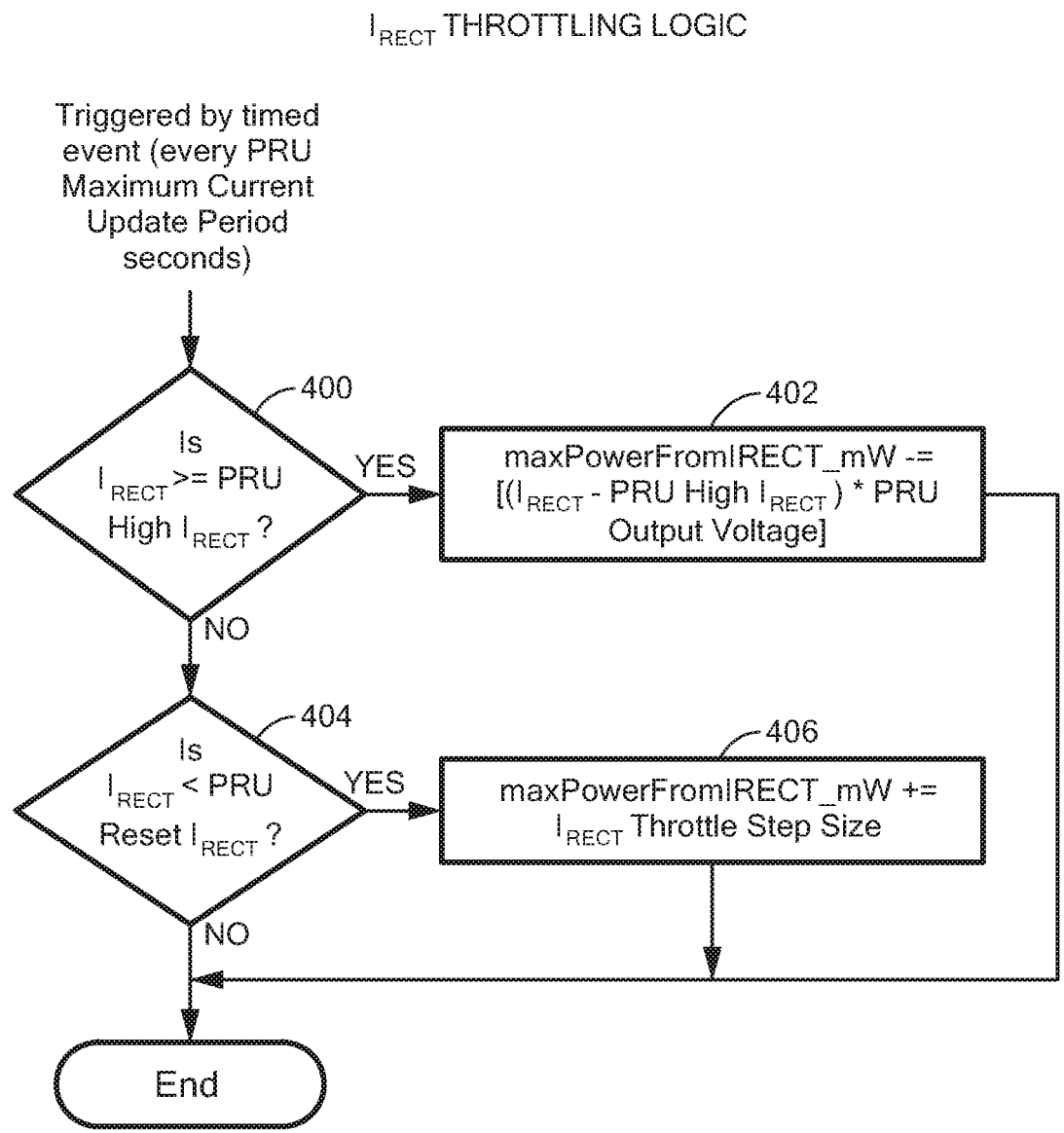
FIG. 4A is a flow diagram showing an illustrative sequence of steps for adjusting power to a load based on current measurements in a PRU.
Figure 4B:
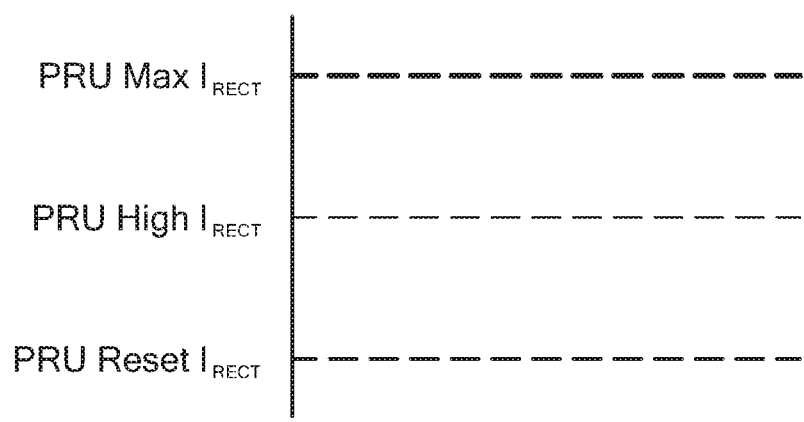
FIG. 4B is a graphical representation of illustrative current thresholds that may be used for the processing of FIG. 4A.

FIG. 4A shows a flow diagram for processing PRU rectified current related to power delivery to a load and FIG. 4B shows example rectified current levels. In the illustrated embodiment, PRU rectifier currents are measured and used to adjust PRU power. FIG. 4B shows example current levels of PRU Max $I_{RECT}$, PRU High $I_{RECT}$, and PRU Reset $I_{RECT}$. In one particular embodiment, the PRU rectifier current $I_{RECT}$ can correspond to rectifier current from the rectifier 116 shown in FIG. 1. It is understood that any practical number of current measurements can be used to meet the needs of a particular application.

In general, the PRU rectifier current $I_{RECT}$ is limited to a suitable level while delivering as much power to the PRU load as possible. In embodiments, error condition occurs if the PRU rectifier current $I_{RECT}$ is above a maximum threshold, which is illustrated in FIG. 4B as PRU Max $I_{RECT}$.

In step 400, the PRU rectifier current $I_{RECT}$ is measured to determine whether the current is greater than a certain threshold, shown as PRU High $I_{RECT}$ in FIG. 4B. If so, in step 402, PRU requests that the load decrease the power the PRU is delivering by a given amount. In an embodiment, the amount of decrease is determined as $(I_{RECT}-\text{PRU High } I_{RECT})*\text{PRU Rectified Voltage}$. The current, which is the difference of the measured current and the threshold defined by PRU High $I_{RECT}$ in FIG. 4B, is multiplied by the PRU rectified voltage to convert to a power value. In step 404, if the PRU measures a rectifier current $I_{RECT}$ that is less than PRU Reset $I_{RECT}$, then, the PRU requests that the power delivered to the load by the PRU be increased by amount corresponding to $I_{RECT}$ Throttle Step Size. It is understood that the $I_{RECT}$ Throttle Step Size can be selected to increase the rectifier current relatively slowly or rapidly in order the meet the needs of a particular application. It will be appreciated that larger step sizes more rapidly increase currents while smaller step sizes provide more granularity. The step size can be a fixed step size or a percentage. If the PRU measures a current between PRU High $I_{RECT}$ and PRU Reset $I_{RECT}$, then no change is made to the requested power output.

It will be appreciated that the more the measured PRU rectifier current $I_{RECT}$ is above the threshold PRU High $I_{RECT}$, the larger the amount the power is reduced. For example, if the rectifier current $I_{RECT}$ is only slightly above the threshold PRU High $I_{RECT}$ the value of $(I_{RECT}-\text{PRU High } I_{RECT})$ may be close to zero so as to generate a relatively small amount of decrease for the "−=" operation shown in step 402.

In embodiments, the power increase and decrease steps can be the same or different. It is understood that rectifier current adjustment processing can occur a selected number of times per unit of time to meet the needs of a particular application. In one embodiment, rectifier current based maximum power processing occurs every two seconds.

As noted above, a PTU may send commands to one or more PRUs to reduce loading, such as via a wireless communication channel, e.g., BLUETOOTH. When a PTU sends an adjust power command, the command may include information with respect to a level to which the power to the load on the PRU should be adjusted. When a PTU sends an adjust power command, a maximum load power draw may be defined and multiple percentages of that maximum load power draw can be commanded. The PTU may also send the absolute value of the maximum power allowed at any given time. In one example, a PTU can send a command to a PRU to adjust loading to 50% of some PTU defined maximum load power draw. The PTU may also command multiple percentages of load power based on the PRU defined maximum load power draw. In examples, the PTU can send a command to a PRU to adjust loading to 25%, 33%, 50%, 65%, or 75% of the PRU defined maximum load power draw.

Figure 5:
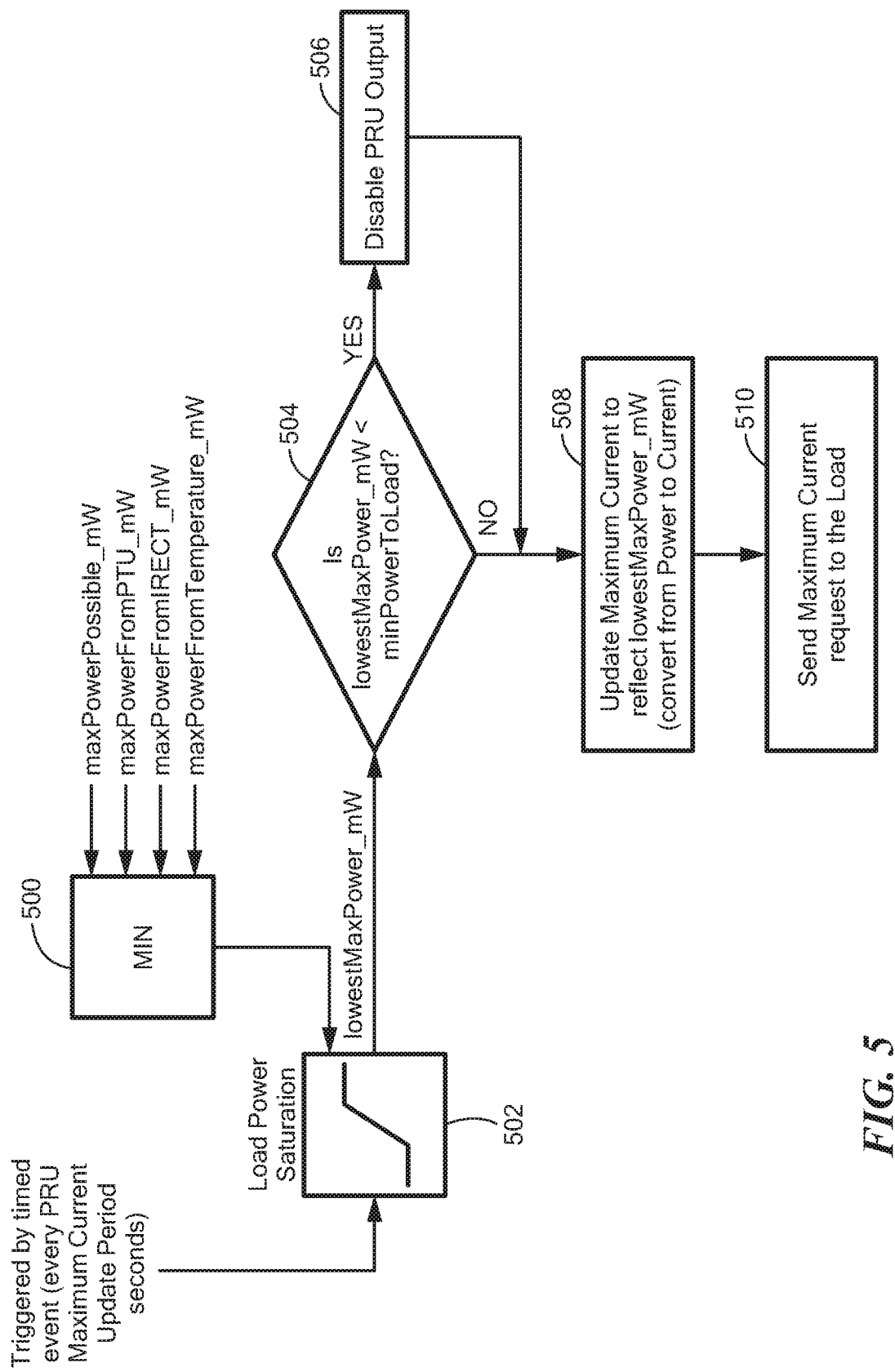
FIG. 5 is a flow diagram showing an illustrative sequence of steps for adjusting power to a load.

FIG. 5 shows a flow chart with illustrative steps for generating power limiting requests for adjustment of power to a load. In general, the PRU gathers operating information, such as temperature and current measurements to determine the maximum powers with respect to each operating characteristic. It then can determine which maximum power value is the lowest. The lowest value is then sent to the load as maximum power or current that the load can draw from the PRU.

In embodiments, the levels can be tiered, so there can be one processing technique employed for a certain tier, and another for another tier, with each tier having a priority level or weighting value. The lowest power value between all of the tiers can be selected to be the maximum power request sent to the load.

In some embodiments, a first tier can be a given power value, and this value can be sent to the load. A second tier of the remaining power values can be averaged and/or weighted, for example. In embodiments, weighting values can be determined by a risk or priority number, for example, or any suitable scheme to meet the needs of a particular application. Weighing can be accomplished by multiplying by a factor.

It is understood that various operating information can be collected and processed to meet the needs of a particular application. For example, operating information can include temperature information, current measurement in the source, current measurement in the device, payment or pricing information, and/or coupling between the source and the device. How often the operating information is gathered can depend on the need of the particular application or the type of operating information. In embodiments, one or more maximum powers can be determined by one or more pieces of the operating information and the lowest power can be selected from one or more maximum powers determined by one or more pieces of operating information. In other embodiments, one or more maximum powers can be determined by one or more pieces of operating information, and weighted, such as based on risk and/or priority. Risk and/or priority can be based on severity of the impact on the system, performance, or safety, or the likelihood of failure occurring. Risk and/or priority can be based on the time to failure or impact on performance. Priority can be based on negotiated load, grid, or power sharing requirements, such as time to charge, tolerance to temperature. In embodiments, one or more maximum powers can be determined by one or more pieces of operating information and averaged over time and/or sorted into categories of priorities.

In the illustrated embodiment, in step 500 the PRU collects power limiting information from temperature processing shown as maxPowerFrom Temperature_mW from FIG. 3A and rectifier current processing shown as maxPowerFromI$_{RECT}$—mW from FIG. 4A. In the example embodiment of FIG. 5, the PRU also collects a maximum possible power value shown as maxPowerPossible_mW and a maximum power value from a PTU, shown as maxPowerfromPTU_mW.

In step 502, the received lowest power from step 500 is constrained within load power saturation limits to generate a lowest maximum power value shown as lowestMaxPower_mW. In step 504, it is determined whether the lowest maximum power value lowestMaxPower_mW is less than a minimum power to the load. The minimum power to the load can be communicated from the load 114 to the PRU, and can be a minimum power level that the load can accept power. If the lowest maximum power value lowestMaxPower_mW is less than a minimum power to the load, in step 506, the PRU output is disabled. If not, in step 508, the maximum load current is updated to correspond the lowest maximum power, which is derived by dividing the lowest maximum load power by the load voltage. In step 510, a request to the load is sent with the maximum load current draw. In one embodiment, processing can continue in step 500 in an iterative fashion.

In embodiments, the load should update its load settings within a predetermined load update time after receiving a new maximum load current request from the PRU. The value of the maximum load current is changed based on the PRU maximum load current update period. If the maximum load power value is less than the load's desired minimum power, then the PRU disables the output voltage (V$_{OUT}$), as shown in step 506.

With this arrangement, temperature and currents, operating parameters from the source, and other operating parameters, can be processed to update load power draw. Load efficiency can be improved as power dissipation and component temperature is reduced by adjusting load power draw by sending messages to the load. It is understood the message to the load for the load to adjust power draw can take multiple forms. For example, the message can be a command for a maximum current, a command to request a constant current (or voltage, or power) draw, a percentage of a maximum, or a command to throttle (increase or decrease) by an amount or a step size.

Figure 6:
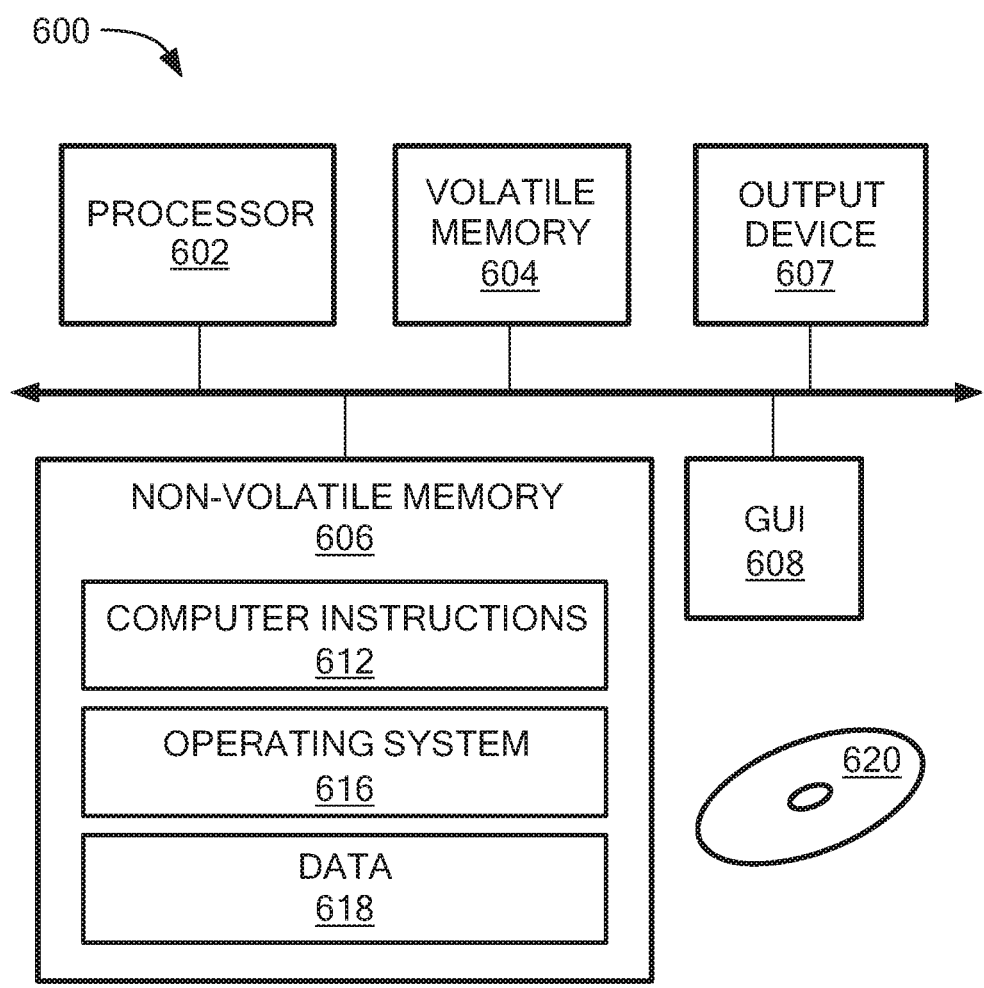
FIG. 6 shows a schematic representation of an illustrative computer that can perform at least a portion of the processing described herein.

FIG. 6 shows an exemplary computer 600 that can perform at least part of the processing described herein. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   powering a load coupled to a device receiving wireless transfer of energy from a source;
   gathering operating information for the device;
   processing the gathered operating information;
   generating a message by the device commanding the load to adjust a power draw of the load based on the processed operating information; and
   sending the message to the load,
   wherein the message includes a respective maximum power that the load can request.

2. The method according to claim 1, wherein the operating information includes temperature information for the device.

3. The method according to claim 1, wherein the operating information includes at least one current measurement in the device.

4. The method according to claim 3, wherein the at least one current measurement in the device comprises a measurement of rectifier current.

5. The method according to claim 1, wherein the operating information includes at least one of temperature information, current measurement in the source, current measurement in the device, and/or coupling efficiency between the source and the device.

6. The method according to claim 1, further including determining a plurality of maximum powers based on one or more pieces of the gathered operating information, wherein the respective maximum power that is included in the message is the lowest one of the plurality of maximum powers.

7. The method according to claim 1, wherein the respective maximum power that is included in the message is determined based on one or more pieces of the gathered operating information and weighted based on one or more pieces of operating information before being included in the message.

8. The method according to claim 7, wherein the weighting is performed based on risk and/or priority.

9. The method according to claim 1, further including determining the respective maximum power by averaging a plurality of maximum power values over time.

10. The method according to claim 1, further including determining a plurality of maximum powers based on one or more pieces of the gathered operating information, and sorting the one or more maximum powers into categories of priorities, wherein the respective maximum power that is included in the message is one of the plurality of maximum powers.

11. The method according to claim 1, wherein the message to the load includes a maximum current that the load can request.

12. The method according to claim 1, wherein the message to the load includes at least one of a constant current, a constant voltage, and a constant power that the load can request.

13. The method according to claim 1, wherein the load comprises a battery of an electric vehicle.

14. The method according to claim 1, wherein the device throttles power to the load by a step size.

15. The method according to claim 14, wherein the step size includes a throttle step size for decreasing power to the load that is different than a throttle step size for increasing power to the load.

16. The method according to claim 14, wherein the device throttles power to the load to avoid exceeding a maximum rectifier current in the device.

17. The method according to claim 1, further including sending a message to the load with a command to reduce power draw of the load.

18. A system, comprising:
    a device to receive wireless transfer of energy from a source, wherein the device is configured to power a load, wherein the device comprises a processor configured to:
    gather operating information for the device;
    process the gathered operating information;
    generate a message commanding the load to adjust a power draw of the load based on the processed operating information; and
    send the message to the load,
    wherein the message includes a respective maximum power that the load can request.

19. The system according to claim 18, wherein the operating information includes at least one of a current and temperature information for the device.

* * * * *